Dec. 23, 1952    G. B. CRISP    2,622,312
POWER-DRIVEN ROTARY SCALING MACHINE
Filed April 30, 1948
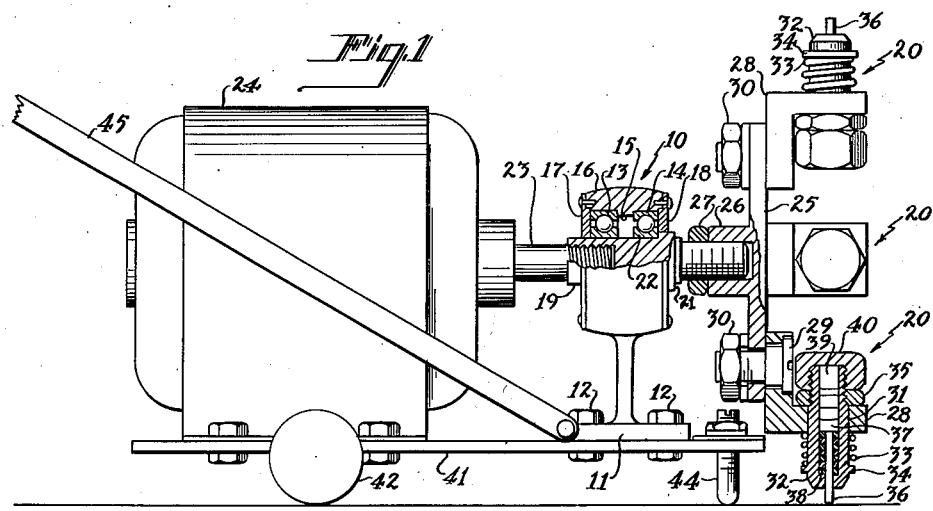
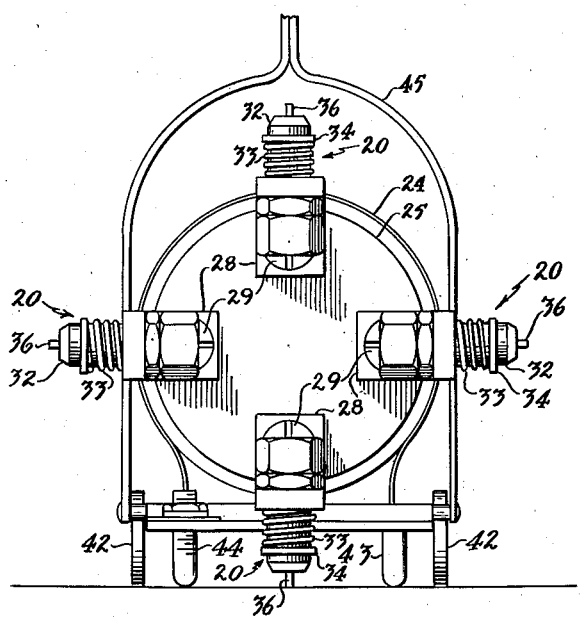
INVENTOR.
George B Crisp Patented Dec. 23, 1952

2,622,312

UNITED STATES PATENT OFFICE 2,622,312

POWER-DRIVEN ROTARY SCALING MACHINE

George B. Crisp, Brooklyn, N. Y.

Application April 30, 1948, Serial No. 24,131

1 Claim. (Cl. 29—81)

This invention relates to scaling tools, and more particularly to scaling tools of the power operated type as are used for the removal of rust and paint or the like from iron or other surfaces.

It is an object of the invention to provide a scaling tool having generally improved characteristics over scaling tools heretofore used and known to the art.

It is a further object of the invention to provide a scaling tool which is safe and reliable in operation, and is economical to manufacture.

Further objects and advantages of the invention will be afforded by the following detailed description considered in connection with the accompanying drawing, and those features of the invention which are believed to be novel and patentable will be pointed out in the claim appended hereto.

The invention will be described with reference to the accompanying drawing wherein—

Figure 1 is a cross sectional view of a scaling tool embodying the invention.

Figure 2 is an end view of the scaling tool showing the scaling bit assemblies.

Referring to the drawing in detail, a bearing assembly 10, comprising a base 11 and bearing housing 16, is secured to a base plate 41 by means of bolts and nuts 12. The bearing housing 11 is provided with self-aligning ball bearing assemblies 13 and 14 positioned by means of a tongue 15 of the top bearing housing portion 16, and retaining plates 17 and 18.

Bearing assemblies 13 and 14 are similarly formed, comprising an outer race and inner race, and having a plurality of ball bearings riding in suitable grooves of said inner and outer races. The outer ring is securely positioned in the bearing housing assembly and the inner ring or race 22 is permitted a rotational movement respective the longitudinal axis of a shaft passing through the bearing so that warping of the shaft does not cause excessive wear of the bearing. The movement of the inner race respective the outer race is accomplished by providing a predetermined space between the inner and outer races as illustrated in the sectional segment of Figure 1 illustrating the bearing assembly.

Coupling between a motor 24 and cutter disc 25 of the scaling tool is effected by means of a spindle shaft 19 which is provided with an external thread for coupling at one extremity, and with an internal thread for coupling at the other extremity. The internal thread of spindle 19 couples to an external thread portion of motor shaft 23. The external thread portion of spindle 19 engages an internal thread coupling member 26 of cutter assembly disc 25, and is locked in place by means of locknut 27. Shaft vibration and thrust load are resisted by passing spindle 19 through self-aligning bearing assemblies 13 and 14, and having a collar 21, which is secured to spindle shaft 19, in abutment with an inner bearing race 22 of the bearing assembly 14.

The cutter assembly is formed with a disc 25, to which is secured a plurality of cutter tools in balanced arrangement. Each cutter tool comprises a body member 32 adapted to receive, and project from one end thereof a cutter or tool bit 36 with shoulder 37; washers 38 for centering said tool bit; and spacer discs 39. Each cutter tool 20, is secured to disc 25 by means of brackets or arms 28 which are fastened to the disc by means of bolts 29 and nuts 30. The cutter tools 20 are resiliently secured to brackets or arms 28 by means of springs 33 which are in engagement with a flange 34 of body member 32 at one extremity, and with a surface area of arms 28, and by means of a nut 35 and cap nut 40 in engagement with an opposite surface of arm 28.

Although arm 28 has heretofore been referred to as being secured to disc 25, I desire it understood that the arms have some freedom of movement, and this freedom of movement in conjunction with the ability of spring 33 to recoil, permits the arm and spring to absorb sudden stresses to which tool bit 36 is subjected when it strikes another surface.

Ease of operation of the scaling tool is accomplished by mounting the base plate 41 on wheels 42 and pins 43 and 44, and providing a handle 45 for propelling the tool in the process of operation. Thus it is no longer necessary for an operator to carry a heavy scaling tool, as with my improved scaling tool, the operator is merely required to move the tool by means of the handle 45.

Having thus disclosed and described my invention, I desire to point out that modifications of the particular arrangement which I have disclosed as embodying my invention will occur to those skilled in the art, so that I do not desire my invention to be limited to the particular arrangement set forth, and I intend in the appended claim to cover all modifications thereof which do not depart from the spirit and scope of my invention.

What is claimed is:

In a power driven rotary scaling machine comprising a base member, a motor secured to said base member and a cutter assembly adapted to be rotated by said motor, said cutter assembly including a disc, a plurality of brackets arrayed in balanced position around the circumference of said disc, a plurality of cutter tools each comprising a hollow body member having a threaded portion at one extremity and an aperture for receiving a tool bit at the other extremity thereof, a flange adjacent the extremity adapted to receive said tool bit, and means resiliently securing said cutter tools to each of said brackets, said means including a spring between said flange and one side of said bracket and a threaded cap in engagement with the threaded portion of said body member on the other side of said bracket.

GEORGE B. CRISP.

REFERENCES CITED

The following references are of record in the file of this patent:

UNITED STATES PATENTS

| Number | Name | Date |
|---|---|---|
| 848,459 | Grant | Mar. 26, 1907 |
| 1,576,170 | Yelding | Mar. 9, 1926 |
| 1,745,100 | Johnston | Jan. 28, 1930 |
| 1,874,220 | Aurand | Aug. 30, 1932 |
| 2,048,972 | Scheffler | July 28, 1936 |
| 2,232,159 | Blood | Feb. 18, 1941 |
| 2,390,353 | Bousky | Dec. 4, 1945 |
| 2,525,250 | Westphal | Oct. 10, 1950 |

FOREIGN PATENTS

| Number | Country | Date |
|---|---|---|
| 160,509 | Great Britain | Mar. 14, 1921 |
| 409,194 | Great Britain | Apr. 26, 1934 |
| 493,435 | Great Britain | Oct. 3, 1938 |